(12) United States Patent
Chen

(10) Patent No.: US 6,231,140 B1
(45) Date of Patent: May 15, 2001

(54) COMPUTER ENCLOSURE

(75) Inventor: Chia Hua Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/474,214

(22) Filed: Dec. 29, 1999

(30) Foreign Application Priority Data

Sep. 14, 1999 (TW) ................................................ 88215738

(51) Int. Cl.⁷ .................................................. A47B 97/00
(52) U.S. Cl. ........................................ 312/223.2; 312/263
(58) Field of Search ............................. 312/223.1, 223.2, 312/265.5, 265.6, 263, 257.1; 361/724, 725, 726, 683

(56) References Cited

U.S. PATENT DOCUMENTS

| 5,491,611 | * | 2/1996 | Stewart et al. ................. 312/223.2 X |
| 5,845,977 | * | 12/1998 | Neukam et al. ................... 312/223.2 |
| 5,884,988 | * | 3/1999 | Foo et al. ........................... 312/223.2 |
| 5,890,783 | * | 4/1999 | Babcock et al. .............. 312/223.2 X |
| 5,931,550 | * | 8/1999 | Chen ............................. 312/223.2 X |
| 5,944,398 | * | 8/1999 | Wu ................................... 312/223.2 |
| 5,964,513 | * | 10/1999 | Korinsky et al. ................. 312/223.2 |
| 5,975,659 | * | 11/1999 | Yang et al. ....................... 312/223.2 |
| 5,992,955 | * | 11/1999 | Yang ................................ 312/265.6 |
| 6,030,062 | * | 2/2000 | Chen et al. ....................... 312/223.2 |

* cited by examiner

Primary Examiner—Peter M. Cuomo
Assistant Examiner—James O. Hansen
(74) Attorney, Agent, or Firm—Wei Te Chung

(57) ABSTRACT

A computer enclosure includes a cage, a side panel attached to the cage and a bezel attached to the cage. The cage defines a number of slots. The side panel forms a number of latches for extending through the slots of the cage and for engaging with the cage. A front lip is formed at the side panel. The bezel abuts against the front lip of the side panel for fixing the side panel to the cage.

8 Claims, 6 Drawing Sheets

COMPUTER ENCLOSURE

BACKGROUND OF THE INVENTION

1. Field of the Invention

The present invention relates to a computer enclosure, and particularly to a computer enclosure including a side panel easily attached thereto.

2. The Related Art

A computer includes a computer enclosure for receiving and shielding the electronic devices thereof. A conventional computer enclosure includes a base and a pair of side panels securely attached to the base by bolts.

Referring to FIG. 1 of the attached drawings, a conventional computer enclosure 100 includes a base 102 and a hood 104 mounted to the base 102. The base 102 has a rear panel 106 which defines two pairs of screw holes 108 in opposite sides thereof. The hood 104 includes a pair of parallel side panels 110 and a top panel 112 connecting between the side panels 110. A pair of flanges 114 contiguously extends from opposite rear edges of the side panels 110. Each flange 114 defines a pair of apertures 116 for receiving bolts (not shown) threadedly engaging the screw holes 108 of the base 102 thereby fixing the hood 104 to the base 102. However, to fix the hood 104 to the base 102 by bolts is complicated and time-consuming.

Thus, it is desired to have a computer enclosure which facilitates assembly/disassembly.

SUMMARY OF THE INVENTION

Accordingly, an object of the present invention is to provide a computer enclosure including a side panel fixed by a bezel attached thereto for facilitating assembly/disassembly.

To fulfil the object mentioned above, a computer enclosure in accordance with the present invention comprises a cage, a side panel attached to the cage and a bezel attached to the cage. The cage defines a plurality of slots. The side panel forms a plurality of latches for extending through the slots of the cage and for engaging with the cage. A front lip is formed at the side panel. The bezel abuts against the front lip of the side panel for fixing the side panel to the cage.

Other objects and advantages of the present invention will be understood from the following description of a computer enclosure according to a preferred embodiment of the present invention.

DETAILED DESCRIPTION OF THE PREFERRED EMBODIMENT

Figure 1:
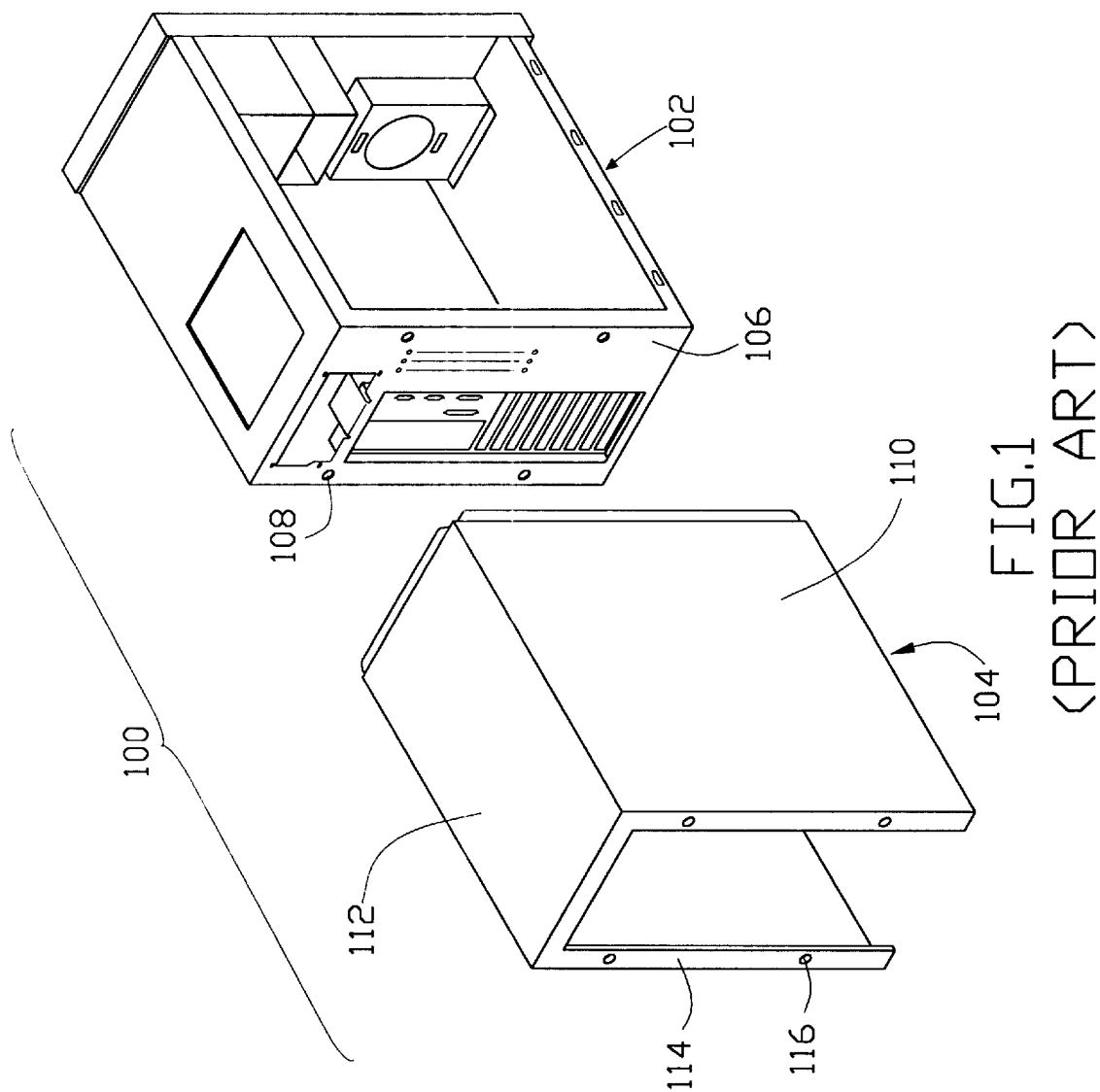
FIG. 1 is an exploded view of a conventional computer enclosure.
Figure 2:
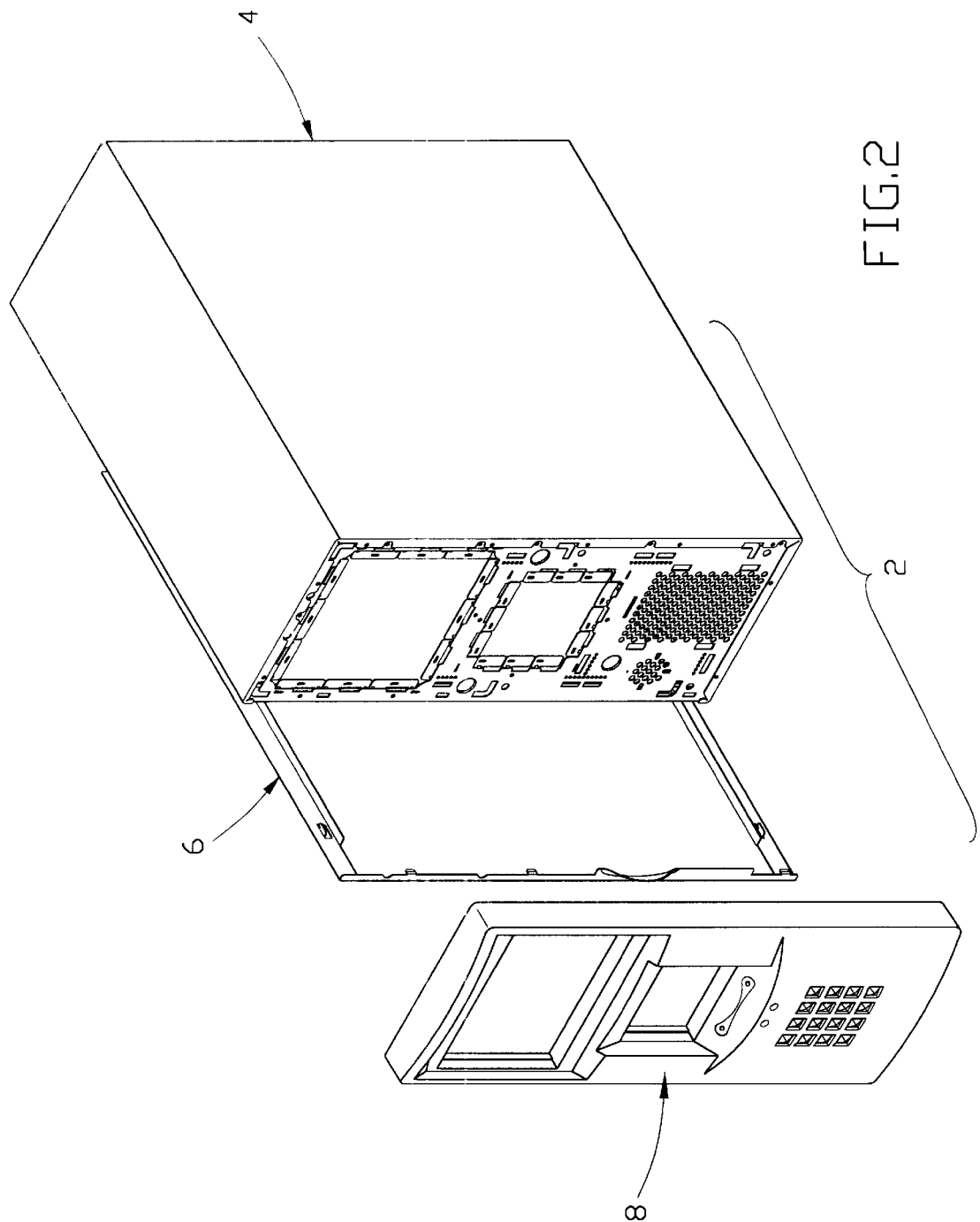
FIG. 2 is an exploded view of a computer enclosure of the present invention.
Figure 3:
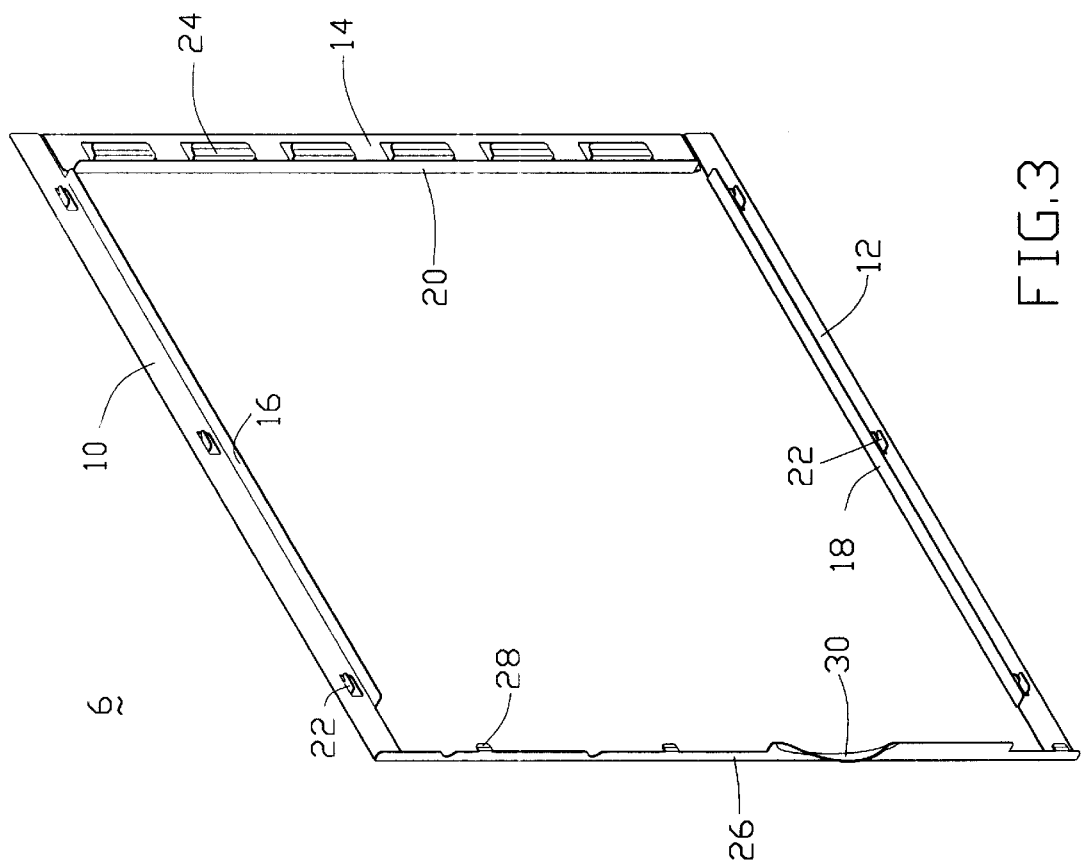
FIG. 3 is a perspective view of a side panel of FIG. 2.
Figure 4:
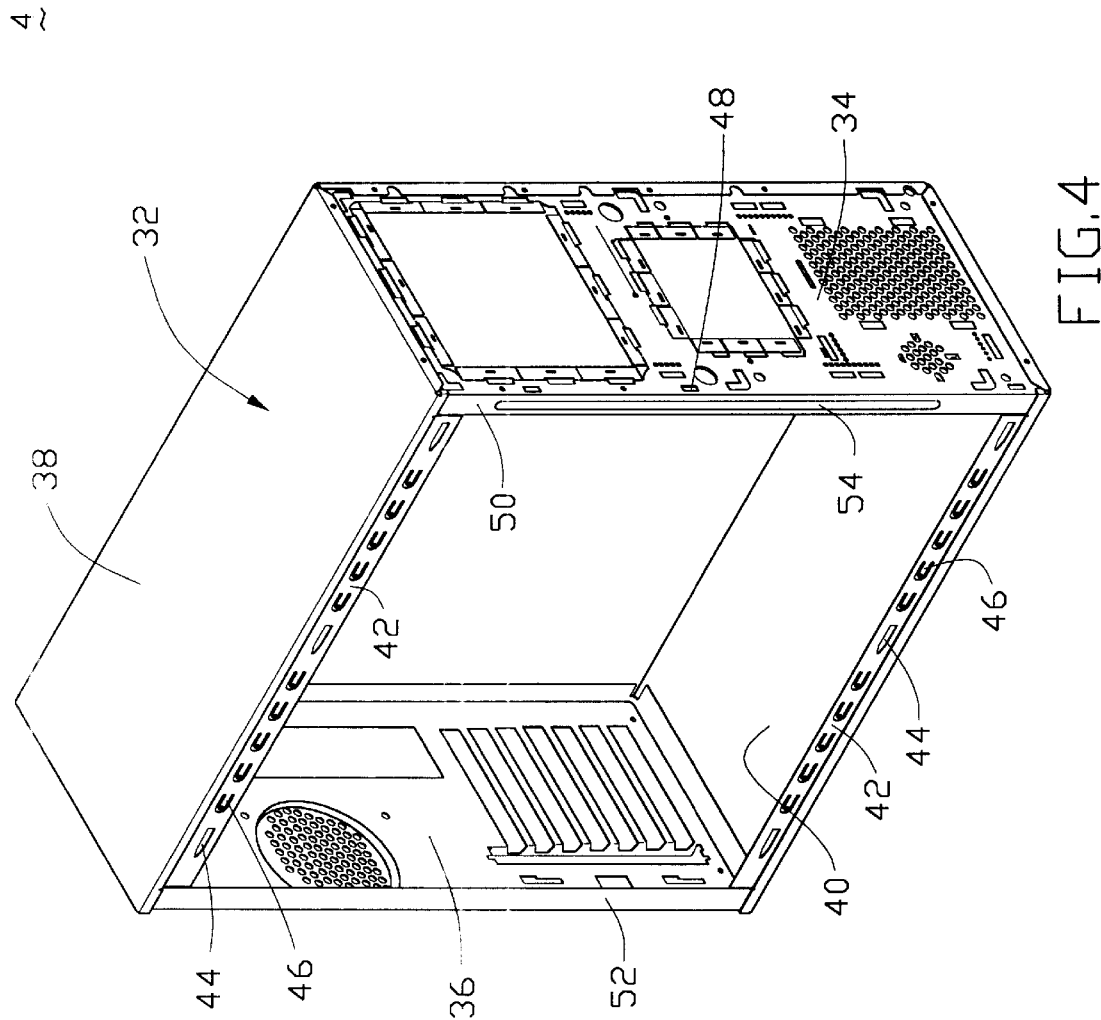
FIG. 4 is a perspective view of a cage of FIG. 2.

Referring to FIGS. 2–4, a computer enclosure 2 in accordance with the present invention includes a cage 4, a side panel 6 attached to a side of the cage 4 and a bezel 8 attached to a front side of the cage 4. The side panel 6 abuts against the bezel 8 thereby being fixed to the cage 4.

The side panel 6 includes a top stacked plate 10, a bottom stacked plate 12 and a rear stacked plate 14 respectively extending from the top, bottom and rear edges thereof. A top lip 16, a bottom lip 18 and a rear lip 20 respectively perpendicularly extend from distal edges of the stacked plates 10, 12, 14. The top and the bottom stacked plates 10, 12 respectively form three latches 22. The rear stacked plate 14 forms six clips 24. A front lip 26 perpendicularly extends from the front edge of the side panel 6. A pair of tabs 28 perpendicularly extends from the front lip 26. A convex handle 30 is formed on the front lip 26 for facilitating handling the side panel 6 in disassembling the side panel 6 from the cage 4.

The cage 4 includes a body 32, a front panel 34 and a rear panel 36. The body 32 includes a top and a bottom panels 38, 40 receiving the front and rear panels 34, 36 therebetween. The top and the bottom panels 38, 40 respectively form a stepped flange 42 at distal edges thereof. Each stepped flange 42 defines three slots 44 therein for engagingly receiving the latches 22 of the side panel 6 and forms a plurality of spring fingers 46 for contacting the side panel 6. The front panel 34 defines a pair of apertures 48 for receiving the tabs 28 of the side panel 6. A front flange 50 and a rear flange 52 respectively extend from the front and the rear panels 34, 36. An elongate protrusion 54 is formed on the front flange 50 for abutment of the side panel 6.

Figure 5:
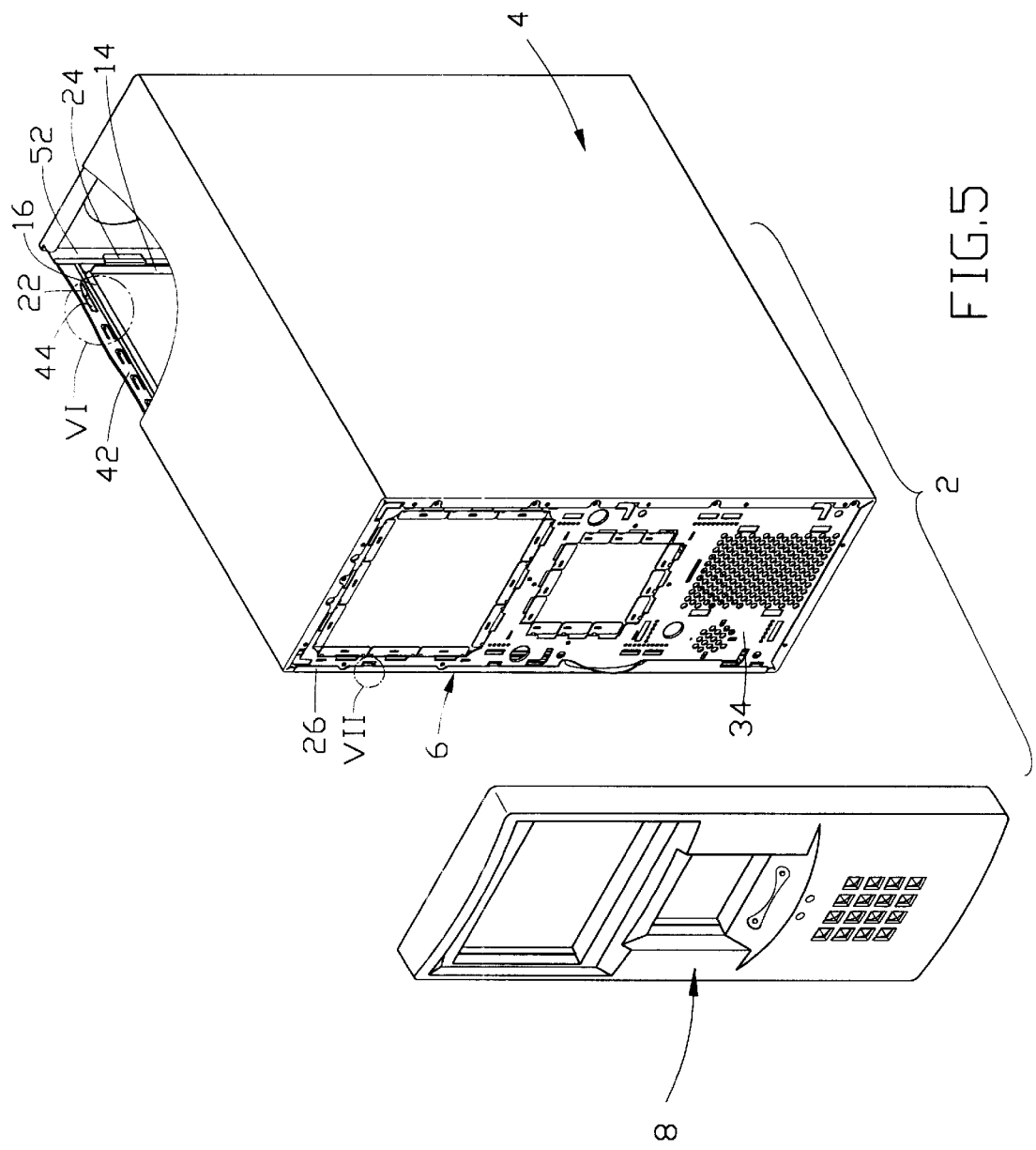
FIG. 5 is a partially assembled view of FIG. 2.
Figure 7:
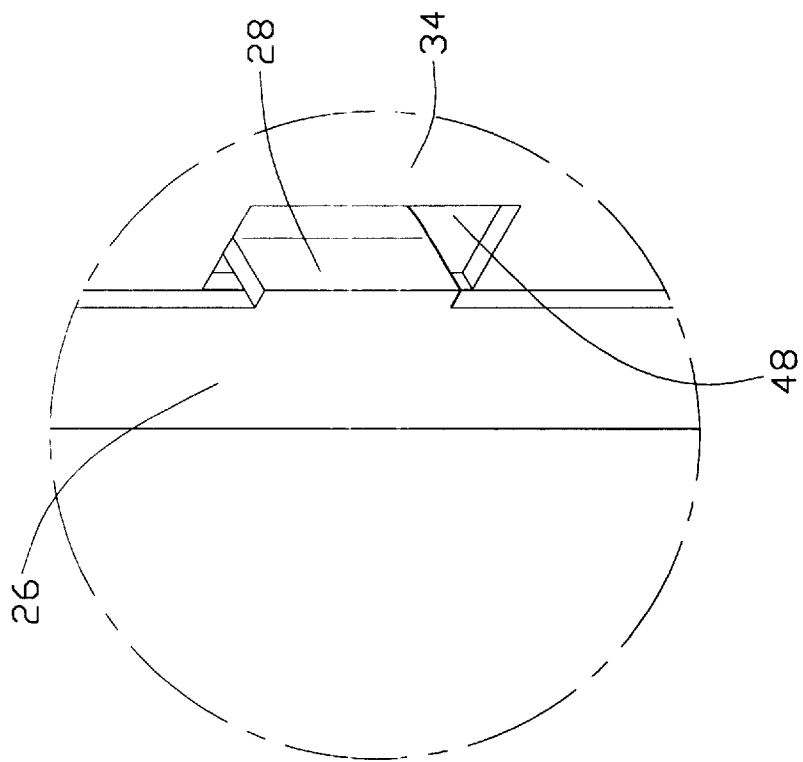
FIG. 7 is an enlarged view of encircled portion VII of FIG. 5.
Figure 6:
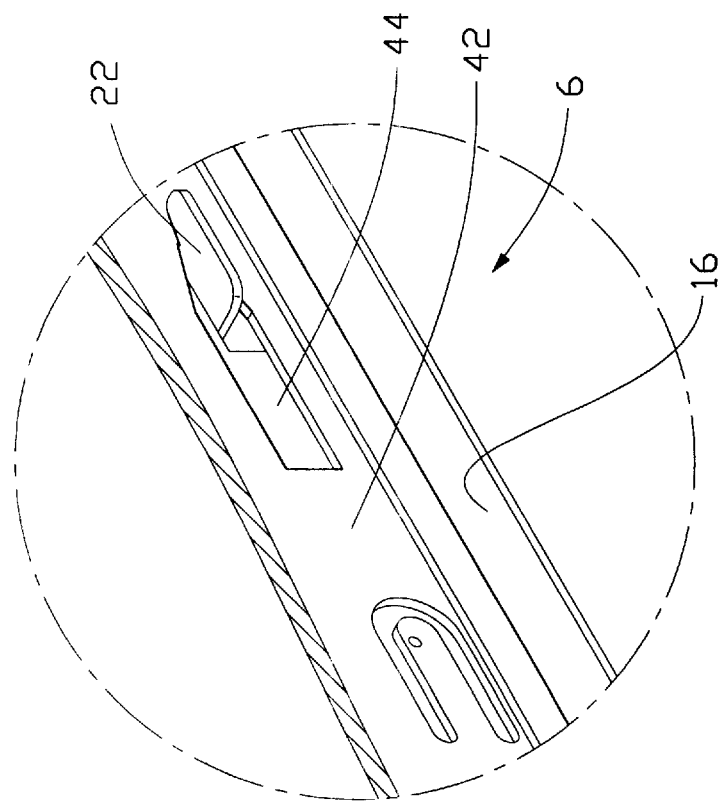
FIG. 6 is an enlarged view of encircled portion VI of FIG. 5.

Referring to FIGS. 5–7, in assembly, the side panel 6 is attached to the cage 4 with the clips 24 of the rear stacked plate 14 thereof engaging with the rear flange 52 of the cage 4. The top and the bottom lips 16, 18 of the top and the bottom stacked plates 10, 12 abut against edges of the stepped flanges 42 of the cage 4. The latches 22 of the top and the bottom stacked plates 10, 12 are engagingly received in the slots 44 of the stepped flanges 42. The tabs 28 of the front lip 26 extend into the apertures 48 of the front panel 34. The bezel 8 is securely attached to the front panel 34 of the cage 4 and contacts the front lip 26 of the side panel 6 thereby fixing the side panel 6 to the cage 4. Thus, the side panel 6 is easily attached to the base 4.

It will be understood that the present invention may be embodied in other forms without departing from the spirit thereof. The present example and embodiment, therefore, is to be considered in all respects as illustrative and not restrictive, and the invention is not to be limited to the details given herein.

What is claimed is:

1. A computer enclosure comprising:
   a cage comprising a front panel, a top panel and a bottom panel connected to the front panel, a respective stepped flange extending from each of the top and the bottom panels to lie in a plane substantially perpendicular to the front, top and bottom panels, each stepped flange defining a plurality of slots;
   a side panel attached to the cage and comprising a top and a bottom stacked plates, each stacked plate forming a plurality of latches for extending through the slots of the cage and for engaging with the cage, a front lip extending substantially perpendicularly from the side panel, a convex handle being formed at the front lip and spaced from the front panel for ease of disassembling the side panel from the cage; and
   a bezel attached to the cage and abutting against the front lip of the side panel for fixing the side panel to the cage.

2. The computer enclosure as described in claim 1, wherein the front lip of the side panel forms a pair of tabs, and the cage defines a pair of apertures in a front panel thereof for receiving the tabs of the side panel.

3. The computer enclosure as described in claim 1, wherein the side panel forms a plurality of clips for engaging with the cage.

4. A computer enclosure assembly comprising:

a cage including a front panel and a bottom panel connected to the front panel, a bottom stepped flange extending upwardly from a distal edge of the bottom panel and defining a plurality of slots therein;

a side panel comprising a bottom stacked plate extending from a bottom edge thereof, the bottom stacked plate defining a plurality of latches latchably extending through corresponding slots, respectively, a bottom lip extending substantially perpendicularly from a distal edge of the bottom stacked plate for supportedly abutting against an edge of the bottom stepped flange to guidingly slide the side panel on the edge of the bottom stepped flange, thereby attaching the side panel to the cage;

a front lip formed on a front edge of and perpendicular to the side panel, a handle being formed at the front lip and spaced from the front panel; and a bezel fastened to the front panel and sandwiching said front lip of therebetween for fixing the side panel to the cage.

5. The assembly as described in claim 4, wherein said latches are formed on upper and lower edges of the side panel, and initially extend through the corresponding slots respectively in a lateral direction.

6. The assembly as described in claim 4, wherein said latches are formed adjacent to the front lip, and extend through the corresponding slots respectively in a front-to-back direction.

7. The assembly as described in claim 4, wherein the cage comprises a top panel forming a top stepped flange at a distal edge thereof, the side panel comprises a top stacked plate extending from a top edge thereof, and wherein a top lip substantially perpendicularly extends from a distal edge of the top stacked plate for abutting against an edge of the top stepped flange.

8. The assembly as described in claim 4, wherein the handle is convex.

* * * * *